(12) United States Patent
Swerchesky et al.

(10) Patent No.: US 9,527,717 B2
(45) Date of Patent: Dec. 27, 2016

(54) BEVERAGE MACHINE OUTLET

(71) Applicant: Keurig, Incorporated, Reading, MA (US)

(72) Inventors: Joel Swerchesky, Derry, NH (US); Nikolas Kastor, Arlington, MA (US)

(73) Assignee: Keurig Green Mountain, Inc., Waterbury, VT (US)

( * ) Notice: Subject to any disclaimer, the term of this patent is extended or adjusted under 35 U.S.C. 154(b) by 617 days.

(21) Appl. No.: 13/795,719

(22) Filed: Mar. 12, 2013

(65) Prior Publication Data
US 2014/0263398 A1    Sep. 18, 2014

(51) Int. Cl.
*B67D 1/14* (2006.01)
*A47J 31/46* (2006.01)

(52) U.S. Cl.
CPC .............. *B67D 1/1422* (2013.01); *A47J 31/46* (2013.01)

(58) Field of Classification Search
CPC .......... A47J 31/44; A47J 31/46; A47J 31/005; A47J 31/4403; B67D 1/1422; B05B 7/0037; B05B 11/3087
USPC ........................ 99/279, 302 R, 306; 222/190
See application file for complete search history.

(56) References Cited

U.S. PATENT DOCUMENTS

| | | | |
|---|---|---|---|
| 3,470,812 A | 10/1969 | Levinson | |
| 3,856,483 A | 12/1974 | Rumpf et al. | |
| 7,316,178 B2 | 1/2008 | Halliday et al. | |
| 2010/0024658 A1* | 2/2010 | Jacobs et al. | 99/302 R |
| 2011/0061534 A1 | 3/2011 | Ozanne et al. | |
| 2011/0097465 A1 | 4/2011 | Bishop et al. | |

FOREIGN PATENT DOCUMENTS

| | | | | |
|---|---|---|---|---|
| DE | 202005011203 U1 | 9/2005 | | |
| EP | 1155721 A1 | 11/2001 | | |
| EP | 1462040 A1 | 9/2004 | | |
| EP | 2543289 A1 | 1/2013 | | |
| EP | 2565151 A1 * | 3/2013 | ............. | A47J 31/44 |
| WO | WO 02074684 A1 | 9/2002 | | |
| WO | WO 02088580 A1 | 11/2002 | | |
| WO | WO 2007042414 A1 | 4/2007 | | |
| WO | WO 2008025730 A1 | 3/2008 | | |

OTHER PUBLICATIONS

International Search Report and Written Opinion from corresponding PCT Application No. PCT/US2014/020493 dated Jun. 2, 2014.

* cited by examiner

*Primary Examiner* — Dana Ross
*Assistant Examiner* — James Sims, III
(74) *Attorney, Agent, or Firm* — Wolf, Greenfield & Sacks, P.C.

(57) ABSTRACT

A method and apparatus for dispensing a beverage from a beverage forming machine with reduced gas bubbles or foam. An outlet chamber may be arranged to separate beverage flow into a liquid component and a gas/liquid component such that the liquid component flows downwardly to a first outlet opening and the gas/liquid component flows upwardly and/or through a tortuous path to condition the gas/liquid component and reduce foam prior to the gas/liquid component exiting a second outlet opening.

11 Claims, 4 Drawing Sheets

BEVERAGE MACHINE OUTLET

BACKGROUND

1. Field of Invention

This invention relates to beverage forming systems, such as coffee brewers that use a liquid to form a coffee beverage.

2. Related Art

Beverage forming systems that use a liquid, such as water, to form a beverage are well known. For example, U.S. Pat. No. 8,361,527 discloses a beverage forming system that uses a beverage cartridge containing a beverage material to make a beverage by introducing liquid into the cartridge. Liquid provided to the cartridge may be heated in a tank prior to delivery to the cartridge.

SUMMARY OF INVENTION

In some embodiments, a beverage forming apparatus may be arranged to dispense a beverage from a beverage forming machine with reduced gas bubbles or foam. An outlet chamber may be arranged to separate a beverage flow into a liquid component and a gas/liquid component. The gas/liquid component includes gas bubbles and liquid, e.g., in the form of a foam or liquid and foam combination. The liquid component may flow downwardly to a first outlet opening of the outlet chamber and the gas/liquid component may flow upwardly and/or through a tortuous path to condition the gas/liquid component and reduce foam prior to the gas/liquid component exiting a second outlet opening of the outlet chamber.

In one aspect of the invention, a beverage outlet for use in dispensing a beverage produced by a beverage forming machine may include an outlet chamber housing having an inlet arranged to receive a beverage, e.g., having a liquid component and a gas/liquid component. A first chamber inside the housing may receive beverage via the inlet and have an upper portion and a lower portion. Fluid, such as the liquid component, that flows from the inlet and to the lower portion of the first chamber flows downwardly to a first chamber outlet. Fluid, such as the gas/liquid component, that flows upwardly from the inlet in the upper portion of the first chamber may be received by a second chamber that conducts the fluid to flow downwardly to a second chamber outlet adjacent the first chamber outlet. Causing the gas/liquid component to flow upwardly not only separates the liquid component from any foam or gas bubbles, but also allows the gas/liquid component to be conditioned to reduce the number and/or size of gas bubbles in the fluid.

In one embodiment, the outlet chamber housing includes a wall in the housing that separates the first chamber from the second chamber so that a portion of flow entering the first chamber via the inlet, e.g., the gas/liquid component must flow upwardly in the upper portion and over the wall to enter the second chamber. Thus, the upper portion of the first chamber may fluidly connect to the second chamber at a point above the inlet, such as at an uppermost part of the outlet chamber. In one arrangement, the second chamber may have portions arranged on opposite sides of the first chamber, e.g., so that the gas/liquid component flows upwardly and then diverges in opposite directions to the second chamber portions. The first and second chambers may be vertically inclined, e.g., to help separate the liquid and gas/liquid components since the gas/liquid component will tend to be lighter than the liquid component.

The outlet chamber housing may include first and second portions, e.g., each arranged like a clamshell. The first housing portion may include the inlet and the second housing portion may include the first and second chamber outlets. The first and second housing portions may be arranged to mate with each other to define the first and second chambers, e.g., with the first portion defining an upper half and the second portion defining a lower half. The chamber portions may be made removable from each other, e.g., via removable clips, so that the chamber can be disassembled for cleaning.

In one arrangement, the beverage outlet may be used in combination with a beverage machine that has a housing to support components of the beverage forming apparatus, a beverage forming station supported by the housing and arranged to combine a precursor liquid with a beverage material to form a beverage that is dispensed via the beverage outlet, and a precursor liquid supply system supported by the housing for providing precursor liquid to the beverage forming station. A control circuit may be arranged to control the liquid supply system to deliver precursor liquid to the beverage forming station, e.g., in response to a user's command to form a beverage. The beverage outlet may be removable from the housing, e.g., for cleaning or replacement.

In another aspect of the invention, a method of dispensing a beverage from a beverage forming machine includes receiving beverage via an inlet into a first chamber of a beverage outlet having an upper portion and a lower portion. A liquid portion of the beverage is separated from a gas/liquid portion by causing the liquid portion to flow downwardly from the inlet and causing the gas and liquid portion to flow upwardly from the inlet. The liquid portion is allowed to exit the first chamber via a first chamber outlet, and the gas and liquid portion are caused to flow toward a second chamber outlet. By separating the liquid component and the gas/liquid component, the gas/liquid component may be conditioned to remove gas bubbles and/or reduce their size, whether by reducing pressure to burst gas bubbles, causing the flow to follow a tortuous path, delaying dispensing of the bubbles to allow them to burst, mechanically contacting the bubbles, etc.

In one arrangement, the method includes causing the gas/liquid portion of the beverage to flow upwardly in the first chamber from the inlet to the upper portion of the first chamber, and causing the gas/liquid portion to flow over a wall and into a second chamber that leads downwardly from the upper portion of the first chamber toward the second chamber outlet. The gas/liquid portion may be conditioned in flow from the inlet to the second chamber outlet so as to burst gas bubbles in the gas and liquid portion, and the conditioned gas/liquid portion may be allowed to exit the second chamber outlet. As a result, the gas/liquid portion that exits the second chamber outlet may include fewer gas bubbles per volume than the gas/liquid portion in the first chamber.

These and other aspects of the invention will be apparent from the following description and claims.

BRIEF DESCRIPTION OF DRAWINGS

Aspects of the invention are described below with reference to the following drawings in which like numerals reference like elements, and wherein.

DETAILED DESCRIPTION

It should be understood that aspects of the invention are described herein with reference to certain illustrative embodiment and the figures. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

Figure 1:
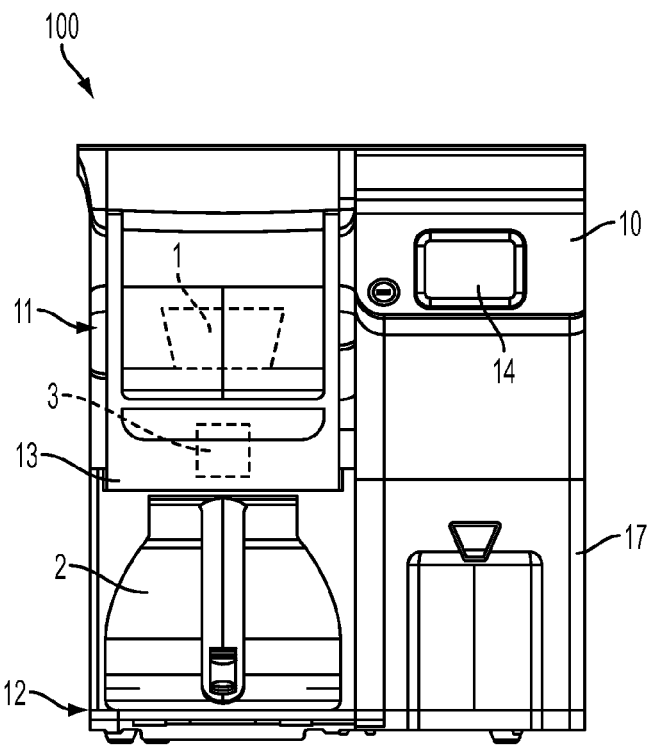
FIG. 1 is a front view of a beverage forming apparatus in an illustrative embodiment.
Figure 2:
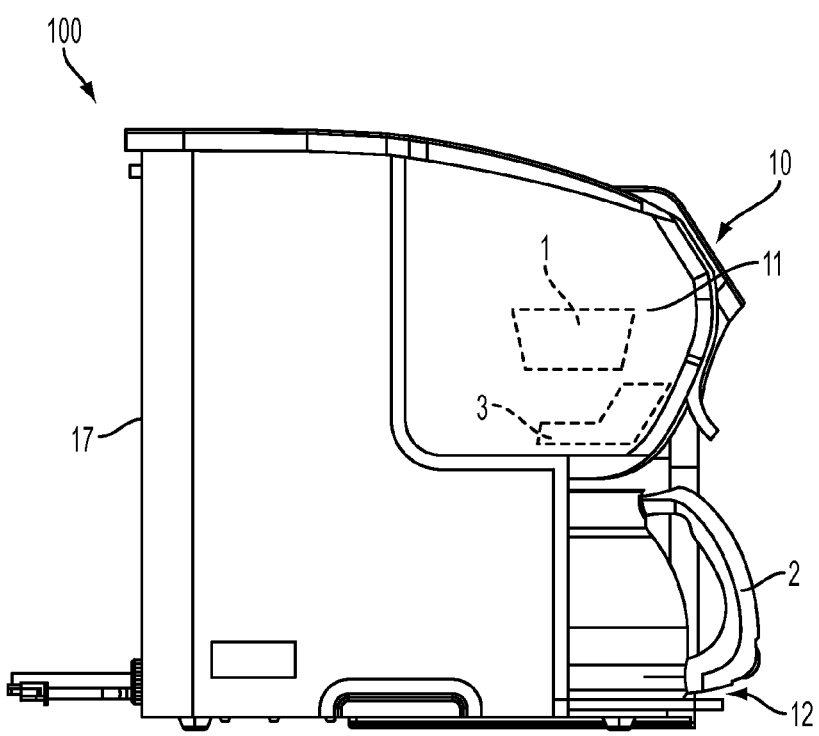
FIG. 2 is a side view of the FIG. 1 embodiment.

FIG. 1 shows a front view of a beverage forming apparatus 100 in an illustrative embodiment that incorporates aspects of the invention. Although the beverage forming apparatus 100 may be used to form any suitable beverage, such as tea, coffee, other infusion-type beverages, beverages formed from a liquid or powdered concentrate, soups, juices or other beverages made from dried materials, or other, in this illustrative embodiment, the apparatus 100 is arranged to form coffee or tea beverages. As is known in the art, a beverage cartridge 1 may be provided to the apparatus 100 and used to form a beverage that is deposited into a carafe 2. (As used herein, a carafe is any suitable container arranged to receive a dispensed beverage.) If used, the cartridge 1 may be manually or automatically placed in a beverage forming station 11 of a beverage forming machine 10. For example, the beverage forming station 11 may include a cartridge holder that is exposed to receive the cartridge 1 when the user operates a handle or other actuator. With the cartridge 1 placed in the cartridge holder, the actuator may be operated to at least partially enclose the cartridge 1, e.g., so that water or other precursor liquid can be introduced into the cartridge 1 to form a beverage. For example, with the cartridge 1 held in the beverage forming station 11, the cartridge 1 may be pierced to form inlet and outlet openings through which water or other precursor liquid enters the cartridge 1 and beverage that exits the cartridge 1, respectively. U.S. Pat. No. 8,361,527 describes a cartridge and a system for introducing liquid into the cartridge that may be used in an embodiment of this invention, and is hereby incorporated by reference in its entirety. Of course, aspects of the invention may be employed with any suitably arranged apparatus 100, including drip-type coffee brewers, carbonated beverage machines, and others arranged to form a beverage regardless of how the beverage is formed. For example, a cartridge 1 need not be used, and instead beverage material used to form a beverage may be provided to a mixing chamber or brew basket by a user or via a hopper system.

In this embodiment, the beverage forming machine 10 includes a housing 17 that houses and/or supports components of the machine 10, such as a user interface 14 used to control system operation, and defines a carafe receiving area 12 at which the carafe 2 is positionable to receive beverage dispensed by the machine 10 via a beverage outlet 3. Thus, at the carafe receiving area 12, the carafe 2 is associated with the machine 10 to receive a dispensed beverage and may be supported by the housing 17. The carafe 2 may be received at the carafe receiving area 12 so that the carafe 2 is at least partially surrounded by the housing 17, or the carafe 2 may be more exposed when at the carafe receiving area 12. The apparatus 100 may include a carafe lid detector 13 that is arranged to detect whether a lid that covers the beverage opening of the carafe 2 is in an open position or a closed position. For example, the lid detector 13 may include a camera or other imaging device that images a portion of the carafe 2 and uses image analysis to determine whether a lid of the carafe is in an open or closed position. In other arrangements, any suitable sensors may be used to detect a lid's presence, such as magnetic, inductive, resistive, capacitive or other sensors used to detect a magnetic or other physical characteristic of a lid. In some embodiments, the beverage forming machine 10 may be controlled to dispense beverage from the beverage outlet 3 only if the carafe 2 is detected to have its lid in the open position. However, the machine 10 need not necessarily have a lid detector 13, and instead may make beverage whether the carafe 2 is suitably positioned at the carafe receiving area 12 or not.

Figure 3:
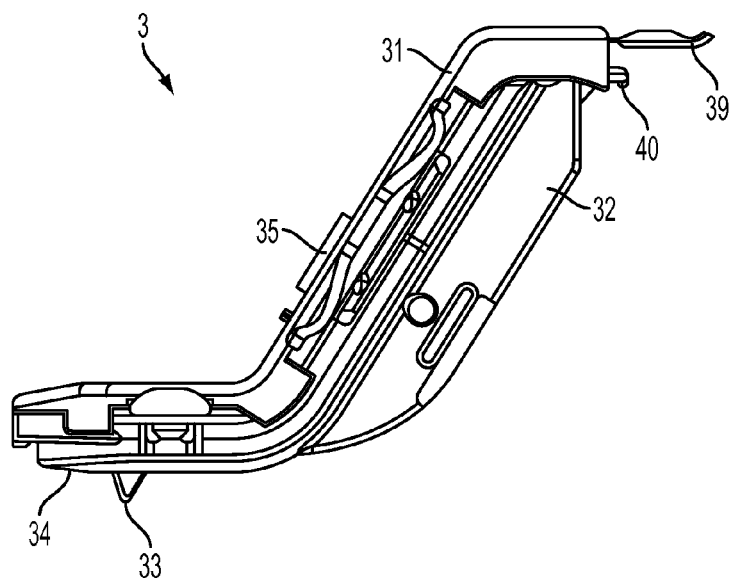
FIG. 3 is a side view of an outlet chamber in an illustrative embodiment.

FIG. 3 shows a side view of the FIG. 1 embodiment, and illustrates that the beverage outlet 3 may be arranged at least partially in the housing 17 and above the carafe 2 to dispense beverage to the carafe 2. While in this embodiment the beverage outlet 3 may be located at least partially in the housing 17, the beverage outlet may be exposed at an exterior of the housing 17. To access the beverage outlet 3, a door or other portion of the housing 17 may be removed or opened to further expose the outlet 3. Such exposure may allow a user to remove all or part of the outlet 3, e.g., for cleaning or replacement. For example, some outlets 3 may be made for use with certain types of beverages, such as coffee, while other outlets 3 may be made for use with other types of beverages, such as tea or a carbonated beverage. Accordingly, the outlet 3 may be exchanged for another outlet 3 in some arrangements for improved beverage production.

FIG. 3 shows a side view of a beverage outlet arranged for use with the FIG. 1 embodiment. The beverage outlet 3 includes an upper housing portion 31 and a lower housing portion 32 that are removably joined together to form an outlet chamber housing. Of course, other arrangements are possible, such as using three or more portions to define the outlet chamber housing, or a single component to define the housing. In this embodiment, the upper and lower portions 32 define clamshell structures, e.g., elements that have one or more cavities defined at an interior side, that when joined together define the various internal chambers of the outlet chamber housing.

The upper housing portion 32 defines an inlet 35 through which a beverage having a liquid component and a gas/liquid component may be introduced into the beverage outlet 3. The inlet 35 may receive beverage in any suitable way, such as by a conduit joined to inlet 35 that conducts beverage from a beverage cartridge 1, a beverage mixing chamber, or other component of the beverage forming station 11 to the beverage outlet 3. As discussed in more detail below, the beverage may separate into a liquid component that flows downwardly from the inlet 35 to a first outlet 33 near a bottom of the outlet 3, and a gas/liquid component that may flow upwardly from the inlet 35, and then flow downwardly to a second outlet 34. The gas/liquid component may be conditioned in flow from the inlet 35 to the second outlet 34 so that gas bubbles are reduced in size and/or number, e.g., to reduce foam in the beverage component prior to exit at the second outlet 34. The first and second outlets 33, 34 may be adjacent each other and positioned at a lowermost portion of the outlet 3 so that beverage dispensed through both outlets 33, 34 may be dispensed together into the carafe 2. In some embodiments, flow of beverage from the first and second outlets 33, 34 may be merged at least to some extent to create a single dispense stream.

Figure 4:
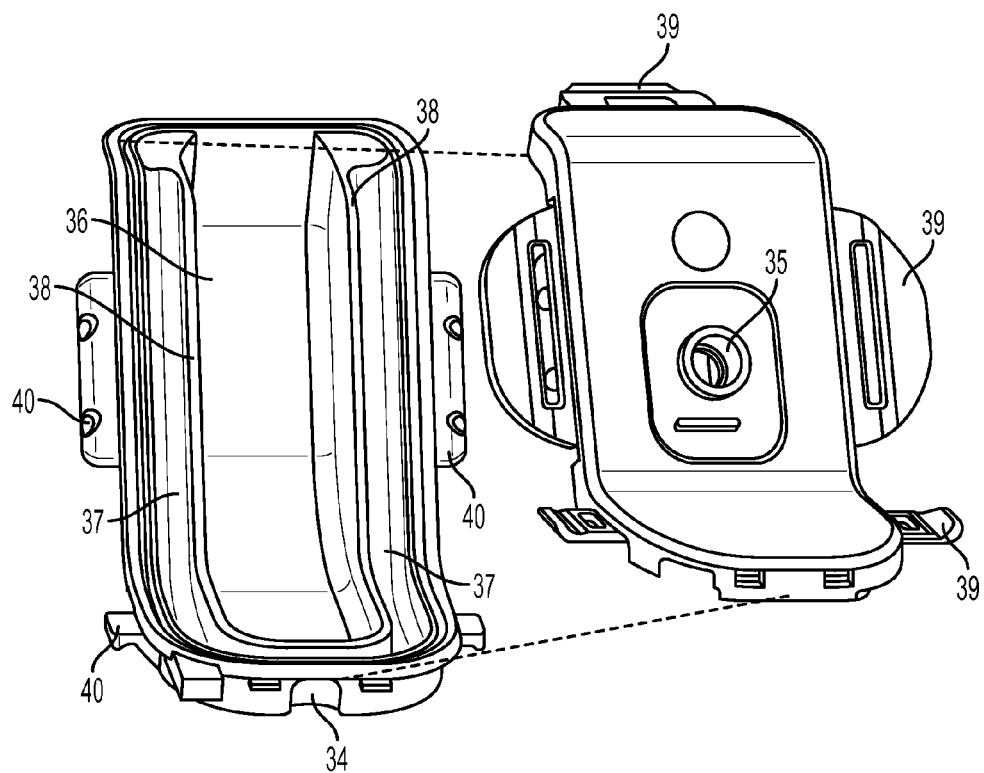
FIG. 4 is a top exploded view of the FIG. 3 outlet chamber.

FIG. 4 shows an exploded view of the beverage outlet 3, including a view that shows first and second chambers 36, 37 defined by the upper and lower housing portions 31, 32. A first chamber 36 is defined near a middle of the outlet 3 and extends from an uppermost portion of the outlet 3 to a lowermost portion. A U-shaped wall 38 separates the first chamber 36 from a second chamber 37 that also extends from the uppermost portion of the outlet 3 to the lowermost portion and forms the second chamber 37 so that portions of the second chamber 37 are on opposite sides of the first chamber 36. (The interior surface of the upper housing portion 31 may define chamber portions similar to that shown for the lower housing portion 32, or may have a substantially flat interior surface. Regardless, portions of the interior surface of the upper housing portion 31 may contact the wall 38 and/or other portions of the lower housing portion 32 to separate and define the first and second chambers 36, 37.) The first chamber 36 is arranged to receive beverage that enters the outlet 3 via the inlet 35. A liquid component of the beverage, e.g., a portion that is mostly liquid and includes fewer gas bubbles, may flow downwardly from the inlet 35 to the first chamber outlet 33 at a bottom of the first chamber 36. In contrast, a gas/liquid component of the beverage, e.g., a portion that includes liquid and more gas bubbles than the liquid component, may flow upwardly from the inlet 35 to the upper portion of the first chamber 36. This upward flow may be due to the relative buoyancy or lower density of the gas/liquid component as compared to the liquid component. That is, since the first chamber 36 may be vertically inclined (e.g., arranged with an upper portion of the first chamber positioned above the lower portion), the lower density gas/liquid component may be prevented from flowing downwardly by gravity and the presence of liquid component in the lower portion of the first chamber 36. As a result, the gas/liquid component may flow upwardly, over an upper end of the wall 38 and into the second chamber 37, or said differently, the first and second chambers 36, 37 may communicate or connect at a point that is above the inlet 35. Thereafter, the gas/liquid component may flow downwardly in the second chamber 37 to the second outlet 34. In its flow from the inlet 35 to the second outlet 34, the gas/liquid component may be conditioned to reduce gas bubbles in the flow via any suitable mechanism. For example, flow from the inlet 35 to the second outlet 34 may be along a tortuous pathway that causes bubbles to burst, whether due to physical contact with walls or other features of the outlet 3, a change in pressure (such as a drop), the passage of time (bubbles in a liquid will frequently burst given sufficient time), etc. The first and/or second chambers 36, 37 may optionally include baffles, protrusions and/or other features along the beverage flow path to aid in conditioning the beverage flow. Also, the generally lower density bubbles may be trapped in the upper portion of the first and/or second chambers 36, 37, preventing their discharge from the second outlet 34 and increasing the likelihood of the bubble's bursting.

In this embodiment, the first and second housing portions 31, 32 may be removably attached, such as by having clips 39 that are pivotally attached to the upper housing portions engage with tabs 40 on the lower housing portion 32. Of course, the housing portions 31, 32 may be engaged in other ways, such as by buckles, snaps, hinges, etc. Also, one or more seal elements, such as an o-ring, gasket, etc., may be provided to create a seal between portions of the housing portions 31, 32 that contact each other, whether to prevent leaking from the outlet 3 and/or to separate the first and second chambers 36, 37 from each other (e.g., where the wall 38 contacts the first housing portion 31). By making the housing portions 31, 32 separable from each other, a user may be able to clean the interior of the outlet. Also, if the first portion 31 is permanently attached to the housing 17 such that the first portion 31 is not removable from the housing 17, the second portion 32 may be removable to allow for cleaning, exchange for another second housing portion 32 that has different beverage conditioning effects, etc.

Figure 5:
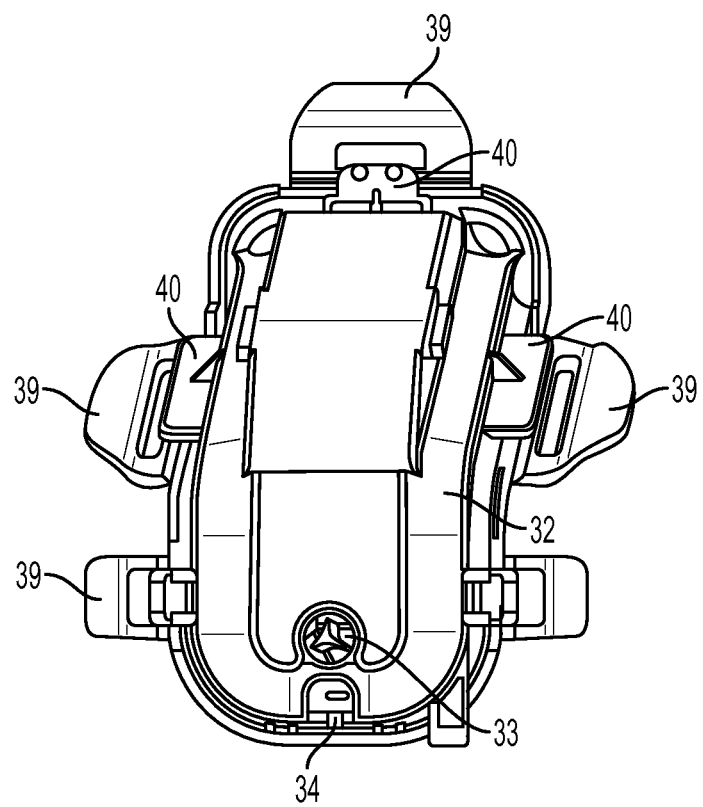
FIG. 5 is a bottom perspective view of the FIG. 3 outlet chamber.

FIG. 5 shows a bottom view of the outlet 3 and illustrates that the first and second outlets 33, 34 are arranged adjacent each other. One or both of the outlets 33, 34 may include a feature to help direct flow in a particular direction, e.g., straight downwardly from the outlet 33, 34 in the view of FIG. 3. For example, one or both of the outlets 33, 34 may include a fin, rib or other feature that helps to merge the outlet flows together, if desired. In this embodiment, and as can be seen in FIGS. 3 and 5, the first outlet 33 may include an angled rib that extends from the first outlet 33 opening and is arranged to encourage flow to move toward the second outlet 34.

Figure 6:
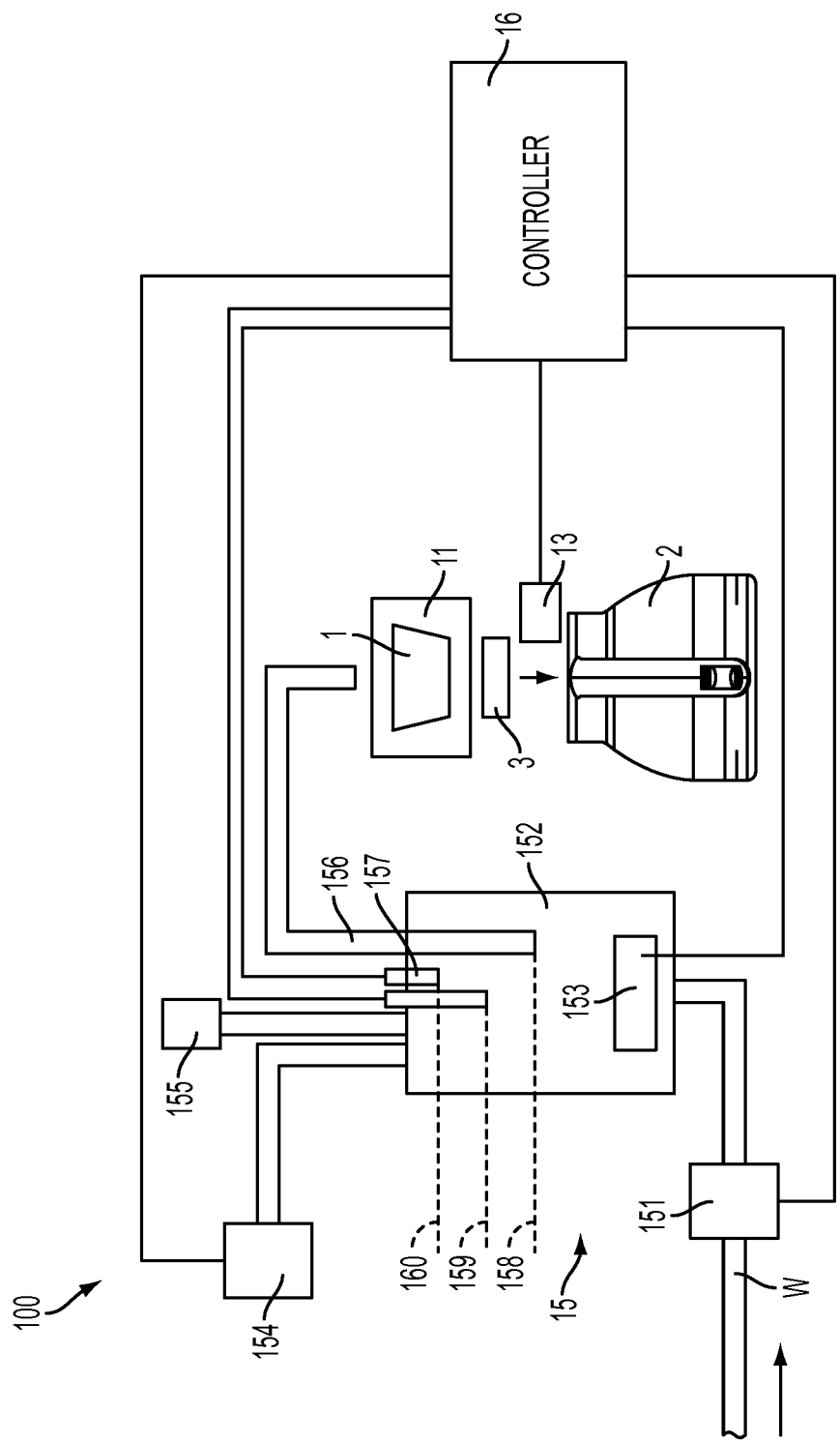
FIG. 6 is a schematic diagram of components of a beverage forming apparatus in an illustrative embodiment.

FIG. 6 shows a schematic block diagram of various components that may be included in a beverage forming apparatus 100 in one illustrative embodiment. Those of skill in the art will appreciate that a beverage forming apparatus 100 may be configured in a variety of different ways, and thus aspects of the invention should not be narrowly interpreted as relating only to one type of beverage forming apparatus. In this embodiment, water or other precursor liquid may be provided by a liquid supply 15 to mix with a beverage material at a beverage forming station 11. The beverage material (such as coffee grounds, tea leaves, a powdered drink mix, etc.) may be provided in a cartridge 1, or not, and beverage produced by mixing the liquid with the beverage material may be dispensed into the carafe 2 via the beverage outlet 3.

The liquid supply 15 in this embodiment controls the volume of liquid provided to the beverage forming station 11 by filling the tank to a liquid dispense level 159, 160 and then pressurizing the tank 152 by way of an air pump 154 so that liquid in the tank 152 is forced out of the conduit 156 to the beverage forming station 11. The volume of liquid delivered to the beverage forming station 11 is equal to the volume in the tank 152 between the liquid delivery level 159, 160 and a post-delivery level 158 at a bottom of the conduit 156 in the tank 152. Since there are two delivery levels 159, 160 in this embodiment, two different volumes can be provided to the beverage forming station 11. However, more than two levels may be used.

In this embodiment, the liquid supply 15 provides liquid to the tank 152 via a valve 151 that is coupled to a source W. The source W may have any suitable arrangement, e.g., may provide liquid from a storage tank, a mains water supply or other source. Thus, in some cases, the liquid provided to the tank 152 may vary in temperature by a wide degree depending on various factors, such as time of year, a temperature of a room in which the machine 10 is located, etc. For example, if the source W is a reservoir that is filled by a user, the temperature of liquid in the reservoir may vary between room temperature (e.g., if liquid sits in the reservoir for an extended time) and a cooler temperature (e.g., if the reservoir has just been filled with water that is dispensed from a tap).

To provide liquid to the tank 152 in this embodiment, the valve 151 is controlled by the control circuit 16 to open and close to provide a desired volume of liquid to the tank 152. For example, if the tank 152 is empty or at the post-dispense level 158, the valve 151 may be opened until a conductive probe or other liquid level sensor 157 provides a signal to the control circuit 16 that indicates when liquid arrives at the dispense level 159, 160. In response to the level sensor 157 detecting liquid at the sensor 157, the control circuit 16 may close the valve 151.

Also, although in this embodiment the liquid level sensor includes a pair of conductive probes capable of contacting liquid in the tank 152 and providing a signal (e.g., a resistance change) indicative of liquid being present at respective dispense levels 159 or 160 in the tank 152, the liquid level sensor may be arranged in other ways. For example, the sensor may include a microswitch with an attached float that rises with liquid level in the tank 152 to activate the switch. In another embodiment, the liquid level sensor may detect a capacitance change associated with one or more liquid levels in the tank, may use an optical emitter/sensor arrangement (such as an LED and photodiode) to detect a change in liquid level, may use a pressure sensor, may use a floating magnet and Hall effect sensor to detect a level change, and others. Thus, the liquid level sensor is not necessarily limited to a conductive probe configuration. Moreover, the liquid level sensor may include two or more different types sensors to detect different levels in the tank. For example, a pressure sensor may be used to detect liquid at the dispense level 160 (e.g., complete filling of the tank 152 may coincide with a sharp rise in pressure in the tank 152), while a conductive probe may be used to detect liquid at the other dispense level 159.

Further, a liquid level sensor need not be used to fill the tank to the dispense level 159, 160. Instead, other techniques may be used to suitably fill the tank 152, such as opening the valve 151 for a defined period of time that is found to correspond to approximate filling of the tank 152 to the desired level. Of course, other arrangements for providing liquid to the tank 152 are possible, such as by a pump (e.g., a centrifugal pump, piston pump, solenoid pump, diaphragm pump, etc.), gravity feed, or other, and the way by which the tank is filled to the dispense level 159, 160 may depend on the technique used to provide liquid to the tank. For example, control of a volume of liquid provided to fill the tank 152 to the dispense level 159, 160 may be performed by running a pump for a predetermined time, detecting a flow rate or volume of liquid entering the tank 152 (e.g., using a flow meter), operating a pump for a desired number of cycles (such as where the pump is arranged to deliver a known volume of liquid for each cycle), detecting a pressure rise in the tank 152 using a pressure sensor, or using any other viable technique.

Liquid in the tank 152 may be heated by way of a heating element 153 whose operation is controlled by the control circuit 16 using input from a temperature sensor or other suitable input. Of course, heating of the liquid is not necessary, and instead (or additionally) the apparatus 100 may include a chiller to cool the liquid, a carbonator to carbonate the liquid, or otherwise condition the liquid in a way that alters the volume of liquid in the tank 152. (Generally speaking, components of the liquid supply 15 that heat, cool, carbonate or otherwise condition liquid supplied to the beverage forming station 11 are referred to as a "liquid conditioner.")

In this embodiment, liquid may be discharged from the tank 152 by an air pump 154 operating to force air into the tank 152 to pressurize the tank and force liquid to flow in the conduit 156 to the beverage forming station 11. Since the conduit extends downwardly into the tank 152, the volume of liquid delivered to the forming station 11 is defined as the volume in the tank 152 between the dispense level 159, 160 and the bottom end of the conduit 156. Again, liquid may be caused to flow from the tank 152 to the beverage forming station 11 in other ways. For example, a pump may be used to pump liquid from the tank 152 to the forming station 11, liquid may be allowed to flow by gravity from the tank 152, and others. A vent 155, which can be opened or closed to vent the tank 152, may be provided to allow the tank 152 to be filled without causing a substantial rise in pressure in the tank 152 and to allow liquid to be delivered from the tank 152 by pressurizing the tank using the air pump 154. In this embodiment, the vent 155 is actually not controlled by the control circuit 16, but remains always open with an orifice of suitable size to allow venting for filling of the tank 152, and air pressure buildup in the tank 152 to allow liquid delivery. Other flow control features may be provided as well, such as a check valve or other flow controller that can prevent backflow in the conduit between the source W and the tank 152, or between the tank 152 and the beverage forming station 11.

The beverage forming station 11 may use any beverage making ingredient, such as ground coffee, tea, a flavored drink mix, or other beverage medium, e.g., contained in a cartridge 1 or not. Alternately, the beverage forming station 11 may function simply as an outlet for heated, cooled or otherwise conditioned water or other liquid, e.g., where a beverage medium is contained in the carafe 2. Once liquid delivery from the tank 156 to the station 11 is complete, the air pump 154 (or other air pump) may be operated to force air into the conduit 156 to purge liquid from the beverage forming station 11, at least to some extent.

Operation of the valve 151, air pump 154 and other components of the apparatus 100 may be controlled by the control circuit 16, e.g., which may include a programmed processor and/or other data processing device along with suitable software or other operating instructions, one or more memories (including non-transient storage media that may store software and/or other operating instructions), temperature and liquid level sensors, pressure sensors, input/output interfaces, communication buses or other links, a display, switches, relays, triacs, or other components necessary to perform desired input/output or other functions.

As noted above, the beverage forming apparatus 100 may include a carafe lid detector 13 that detects whether the carafe lid is in an open or closed position. The detector 13 may detect the presence or absence of the lid 24, and thus detect whether the lid 24 is in the open or closed position. If the lid 24 is detected to be in the closed position, the control circuit 24 may prevent the apparatus 100 from operating to dispense a beverage to the carafe 2. Alternately, the control circuit 16 may interpret the lid 24 being detected in the open position as a beverage formation start command, and fill the tank 152 to the delivery level 159, 160 in response. Thereafter, the liquid could be delivered to the beverage forming station 11 or wait until a user presses a start button. Note that the apparatus 100 need not necessarily be prevented from operating to produce a beverage if the carafe lid is detected to be closed or is not detected to be open. For example, the apparatus 100 may operate to produce a beverage and store the beverage in a holding tank if the carafe lid 24 is closed. If the carafe lid 24 is detected to be in the open position, the control circuit 16 may then control the apparatus 100 to dispense the stored beverage from the holding tank to the carafe 2. The lid detector 13 may include one or more Hall effect sensors, optical detectors, reed switches, microswitches that are closed by physical contact with the carafe lid, and/or other components to detect the presence or absence of the lid 24. The control circuitry 16 may be arranged to suitably interpret any type of signal provided by the detector 13 to determine the lid open/closed state.

According to an aspect of the invention, a method for dispensing a beverage from a beverage forming machine may include receiving beverage via an inlet into a first chamber of a beverage outlet having an upper portion and a lower portion. A liquid portion of the beverage may be separated from a gas/liquid portion of the beverage by causing the liquid portion to flow downwardly from the inlet and causing the gas/liquid portion to flow upwardly from the inlet. For example, the beverage may be received into a first chamber that defines a vertically inclined space such that the liquid component of the beverage flows downwardly in the first chamber toward a first outlet and the gas/liquid component flows upwardly to an upper portion of the first chamber. Thus, the liquid portion may be allowed to exit the first chamber via a first chamber outlet, while the gas/liquid portion takes a different flow route toward a second chamber outlet. In some embodiments, a flow path from the inlet to the second chamber outlet is tortuous and arranged to break or otherwise burst gas bubbles in the gas/liquid portion. For example, the gas/liquid portion may be caused to flow upwardly in the first chamber from the inlet to the upper portion of the first chamber, and then to flow over a wall and into a second chamber that leads downwardly from the upper portion of the first chamber toward the second chamber outlet. The flow in the first chamber, over the wall and in the second chamber may be tortuous or otherwise configured to help burst gas bubbles in the flow. Thus, the gas/liquid portion may be conditioned in flow from the inlet to the second chamber outlet so as to burst gas bubbles in the gas and liquid portion and so that the conditioned gas/liquid portion is allowed to exit the second chamber outlet. Conditioning of the gas/liquid portion may result in fewer gas bubbles per volume in the gas/liquid portion exiting the second chamber outlet than in the gas/liquid portion in the first chamber.

For those systems employing a cartridge 1, once a cartridge is located in the beverage forming station 11, the beverage forming apparatus 100 may use the cartridge 1 to form a beverage. For example, one or more inlet needles may pierce the cartridge 1 (e.g., a lid of the cartridge) so as to inject heated water or other liquid into the cartridge 1. The injected liquid may form the desired beverage or a beverage precursor by mixing with beverage medium in the cartridge 1. The apparatus 100 may also include one or more outlet needles or other elements to puncture or pierce the cartridge 1 at an outlet side (e.g., at the lid of the cartridge) to permit the formed beverage to exit the cartridge 1. Other inlet/outlet piercing arrangements are possible, such as multiple needles, a shower head, a non-hollow needle, a cone, a pyramid, a knife, a blade, etc. Other arrangements for an inlet or outlet are possible however, e.g., the cartridge may have a permeable portion that allows water to flow into and/or beverage to exit cartridge 1. Also, there is no requirement that an inlet and/or an outlet pierce a cartridge to provide liquid to, or receive beverage from, a cartridge. Instead, communication with a cartridge may be performed using any suitable ports or other features.

While aspects of the invention may be used with any suitable cartridge, or no cartridge at all, some cartridges may include features that enhance the operation of a beverage forming apparatus 100. As is known in the art, the cartridge 1 may take any suitable form such as those commonly known as a sachet, pod, capsule, container or other. For example, the cartridge 1 may include an impermeable outer covering within which is housed a beverage medium, such as roasted and ground coffee or other. The cartridge 1 may also include a filter so that a beverage formed by interaction of the liquid with the beverage medium passes through the filter before being dispensed into a carafe 2. As will be understood by those of skill in the art, cartridges in the form of a pod (e.g., having opposed layers of permeable filter paper encapsulating a beverage medium) may use the outer portion of the cartridge 1 to filter the beverage formed. The cartridge 1 in this example may be used in a beverage machine to form any suitable beverage such as tea, coffee, other infusion-type beverages, beverages formed from a liquid or powdered concentrate, etc. Thus, the cartridge 1 may contain any suitable beverage medium, e.g., ground coffee, tea leaves, dry herbal tea, powdered beverage concentrate, dried fruit extract or powder, powdered or liquid concentrated bouillon or other soup, powdered or liquid medicinal materials (such as powdered vitamins, drugs or other pharmaceuticals, nutriaceuticals, etc.), and/or other beverage-making material (such as powdered milk or other creamers, sweeteners, thickeners, flavorings, and so on). In one illustrative embodiment, the cartridge 1 contains a beverage medium that is configured for use with a machine that forms coffee and/or tea beverages, however, aspects of the invention are not limited in this respect.

As used herein, "beverage" refers to a liquid substance intended for drinking that is formed when a liquid interacts with a beverage medium. Thus, beverage refers to a liquid that is ready for consumption, e.g., is dispensed into a cup and ready for drinking, as well as a liquid that will undergo other processes or treatments, such as filtering or the addition of flavorings, creamer, sweeteners, another beverage, etc., before being consumed.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A beverage outlet for use in dispensing a beverage produced by a beverage forming machine, comprising:

an outlet chamber housing having an inlet arranged to receive a beverage, a first chamber inside the outlet chamber housing arranged to receive beverage from the inlet and having an upper portion and a lower portion, a second chamber inside the outlet chamber housing and arranged to receive fluid from the upper portion of the first chamber and to conduct fluid flow downwardly to a second chamber outlet, and a first chamber outlet arranged to receive fluid from the lower portion of the first chamber that flows downwardly in the first chamber from the inlet, the first chamber outlet being adjacent the second chamber outlet, and the inlet being positioned opposite a wall that at least partially defines the first chamber, wherein the inlet and the first chamber are arranged to direct a flow of beverage towards the wall of the first chamber between the upper and lower portions of the first chamber, and such that beverage including gas bubbles that is directed towards the wall is separated such that a liquid component flows downwardly along the wall in the first chamber from the inlet to the first chamber outlet and a gas bubble component flows upwardly along the wall in the first chamber from the inlet to the second chamber.

2. The beverage outlet of claim 1, wherein the outlet chamber housing includes first and second housing portions, the first housing portion including the inlet and the second housing portion including the first and second chamber outlets.

3. The beverage outlet of claim 2, wherein the first and second housing portions are arranged to mate with each other to define the first and second chambers.

4. The beverage outlet of claim 1, in combination with a beverage machine including:
 a housing to support components of the beverage forming apparatus;
 a beverage forming station supported by the housing and arranged to combine a precursor liquid with a beverage material to form a beverage that is dispensed via the beverage outlet;
 a precursor liquid supply system supported by the housing for providing precursor liquid to the beverage forming station; and
 a control circuit arranged to control the liquid supply system to deliver precursor liquid to the beverage forming station.

5. The beverage outlet of claim 4, wherein beverage outlet is removable from the housing.

6. The beverage outlet of claim 1, wherein the outlet chamber housing includes a wall in the housing that separates the first chamber from the second chamber, wherein flow to the second chamber must enter the first chamber via the inlet, and flow upwardly in the upper portion of the first chamber and over the wall to enter the second chamber.

7. The beverage outlet of claim 1, wherein the upper portion of the first chamber fluidly connects to the second chamber at a point above the inlet.

8. The beverage outlet of claim 1, wherein the second chamber has portions arranged on opposite sides of the first chamber.

9. The beverage outlet of claim 1, wherein the first chamber and the second chamber are vertically inclined.

10. The beverage outlet of claim 1, wherein a flow path from the inlet to the second chamber outlet is tortuous to aid in breaking of gas bubbles in flow.

11. The beverage outlet of claim 1, wherein the beverage outlet chamber includes an uppermost portion at which the first and second chambers communicate with each other, and a lowermost portion at which the first and second chamber outlets are positioned, and wherein the inlet is located between the uppermost and lowermost portions.

* * * * *